United States Patent
Sharma et al.

(10) Patent No.: US 11,343,701 B2
(45) Date of Patent: May 24, 2022

(54) WIRELESS COMMUNICATIONS APPARATUS AND METHODS

(71) Applicant: Sony Corporation, Tokyo (JP)

(72) Inventors: Vivek Sharma, Basingstoke (GB); Samuel Asangbeng Atungsiri, Basingstoke (GB); Shin Horng Wong, Basingstoke (GB); Kazuyuki Shimezawa, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/055,135

(22) PCT Filed: May 3, 2019

(86) PCT No.: PCT/EP2019/061452
§ 371 (c)(1),
(2) Date: Nov. 13, 2020

(87) PCT Pub. No.: WO2019/219413
PCT Pub. Date: Nov. 21, 2019

(65) Prior Publication Data
US 2021/0227422 A1    Jul. 22, 2021

(30) Foreign Application Priority Data

May 15, 2018 (EP) ..................... 18172380

(51) Int. Cl.
*H04W 28/02* (2009.01)
*H04W 80/02* (2009.01)

(52) U.S. Cl.
CPC ... *H04W 28/0263* (2013.01); *H04W 28/0268* (2013.01); *H04W 28/0273* (2013.01); *H04W 80/02* (2013.01)

(58) Field of Classification Search
CPC ......... H04W 28/0263; H04W 28/0268; H04W 28/0273; H04W 80/02; H04L 47/34
See application file for complete search history.

(56) References Cited

U.S. PATENT DOCUMENTS

2019/0053326 A1*  2/2019  Lee ..................... H04L 1/1841
2019/0320362 A1* 10/2019  Liu ................... H04W 28/0263
(Continued)

FOREIGN PATENT DOCUMENTS

WO    2018/070689 A1    4/2018

OTHER PUBLICATIONS

International Search Report and Written Opinion received for PCT Application No. PCT/EP2019/061452 dated May 31, 2019, 12 pages.

(Continued)

*Primary Examiner* — Donald L Mills
(74) *Attorney, Agent, or Firm* — Xsensus LLP

(57) ABSTRACT

A method of transmitting data by a communications device, the method comprising receiving a plurality of service data units including a first service data unit and a second service data unit at a Service Data Adaptation Protocol (SDAP), service access point (SAP) according to one or more quality of service (QoS) flows, each of the QoS flows defining a quality of service for the data received from the service data units, mapping the service data units received according to the one or more QoS flows on to one or more radio bearers, each of the one or more radio bearers being defined by a packet data convergence protocol (PDCP) entity within a PDCP layer, forming the service data units into protocol data units for transmission via the radio bearer to which the corresponding QoS flow has been mapped, and transmitting the protocol data units via the corresponding radio bearer.

17 Claims, 7 Drawing Sheets

(56) References Cited

U.S. PATENT DOCUMENTS

| | | | | |
|---|---|---|---|---|
| 2020/0128452 | A1* | 4/2020 | Centonza | H04W 36/0044 |
| 2020/0413479 | A1* | 12/2020 | Yi | H04L 67/322 |
| 2021/0153071 | A1* | 5/2021 | Kim | H04W 80/02 |

OTHER PUBLICATIONS

CATT, "QoS re-mapping of QoS flow and DRB", 3GPP TSG-RAN WG2 Meeting No. 99, R2-1707939 resubmission of R2-1704266, Berlin, Germany, Aug. 21-25, 2017, pp. 1-3.

Mediatek Inc., "SDAP header design for reflective QoS indication and QoS flow remapping", 3GPP TSG-RAN WG2 Meeting No. 99 R2-1708260, Berlin, Germany, Aug. 21-25, 2017, 7 pages.

Huawei et al., "QoS Flow to DRB Re-Mapping", 3GPP TSG-RAN WG2 Meeting No. 99bis R2-1710228 Revision of R2-1708938, Prague, Czech Republic, Oct. 9-13, 2017, 3 pages.

LG Electronics, "QoS flow to DRB remapping", 3GPP TSG-RAN WG2 NR Ad Hoc No. 3, R2-1801237 Resubmission of R2-1711558, Vancouver, Canada, Jan. 22-26, 2018, 3 pages.

Huawei, "Email discussion of [101bis#76][UP] SDAP end marker solutions", 3GPP TSG RAN WG2 Meeting No. 102, R2-1807179, Busan, Korea, May 21-25, 2018, 16 pages.

3GPP, "Service Data Adaptation Protocol (SDAP) specification", 3rd Generation Partnership Project; Technical Specification Group Radio Access Network; E-UTRA and NR, Release 15, 3GPP TS 37.324 V1.5.0, Apr. 2018, pp. 1-12.

3GPP, "Packet Data Convergence Protocol (PDCP) specification", 3rd Generation Partnership Project; Technical Specification Group Radio Access Network; NR, Release 15, 3GPP TS 38.323, V15.1.0, Mar. 2018, pp. 1-25.

Ericsson, "L2 differentiated handling of critical data", 3GPP TSG-RAN WG2 No. 101bis R2-1806186, Sanya, P.R. of China, Apr. 16-20, 2018, pp. 1-6.

Holma et al., "LTE for UMTS OFDMA and SC-FDMA Based Radio Access", System Architecture Based on 3GPP SAE, 2009, pp. 25-27.

* cited by examiner

WIRELESS COMMUNICATIONS APPARATUS AND METHODS

CROSS-REFERENCE TO RELATED APPLICATIONS

The present application is based on PCT filing PCT/EP2019/061452, filed May 3, 2019, which claims priority to EP 18172380.0, filed May 15, 2018, the entire contents of each are incorporated herein by reference.

BACKGROUND

Field

The present disclosure relates to communications apparatus and methods for the transmission of data by a communications device in a cell of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the third generation partnership project (3GPP) defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance. Other types of devices may be deployed in very dense deployments for monitoring equipment, for example within factories; these devices may generate a large volume of data, having varying priority levels.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

The use of different types of applications and different requirements for their associated data give rise to new challenges for efficiently handling communications in wireless telecommunications systems that need to be addressed.

SUMMARY

The present disclosure can help address or mitigate at least some of the issues discussed above.

According to the present technique there is provided a method of transmitting data by a communications device. The method comprises receiving a plurality of service data units including a first service data unit and a second service data unit at a Service Data Adaptation Protocol, SDAP, service access point, SAP, according to one or more quality of service, QoS, flows, each of the QoS flows defining a quality of service for the data received from the service data units, mapping the service data units received according to the one or more QoS flows on to one or more radio bearers, each of the one or more radio bearers being defined by a packet data convergence protocol, PDCP, entity within a PDCP layer, forming the service data units into protocol data units for transmission via the radio bearer to which the corresponding QoS flow has been mapped, and transmitting the protocol data units via the corresponding radio bearer according to the mapping, wherein the communications device is configured to change an order of transmission via one of the radio bearers of protocol data units formed from the first and second service data units in accordance with a determined relative priority of one or more of the service data units with respect to one or more other service data units.

Embodiments of the present technique can provide an arrangement which the transmission of high priority data units associated with a quality of service flow may be prioritised over other data units associated with the same quality of service flow.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
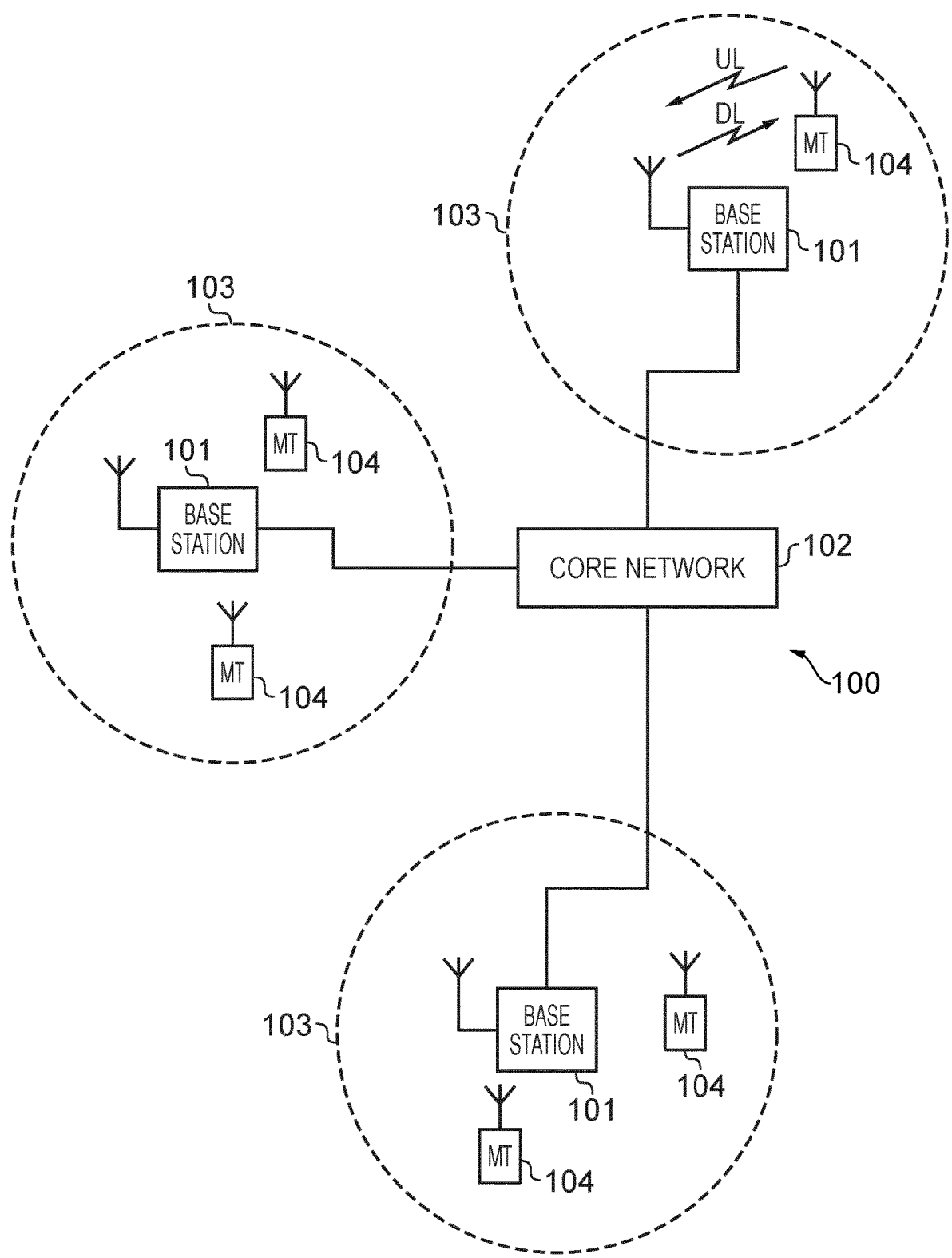
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
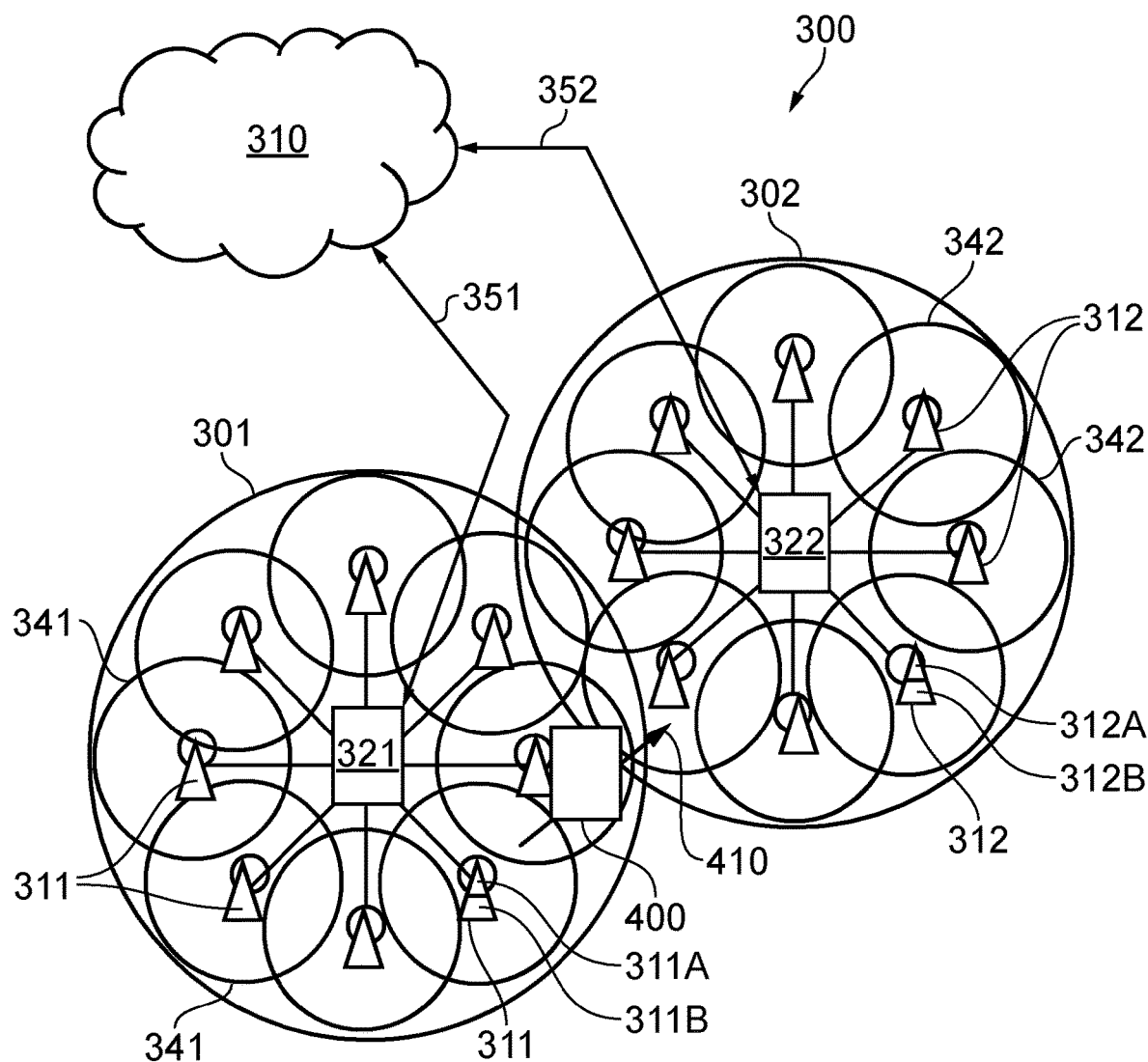
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC Connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

Figure 3:
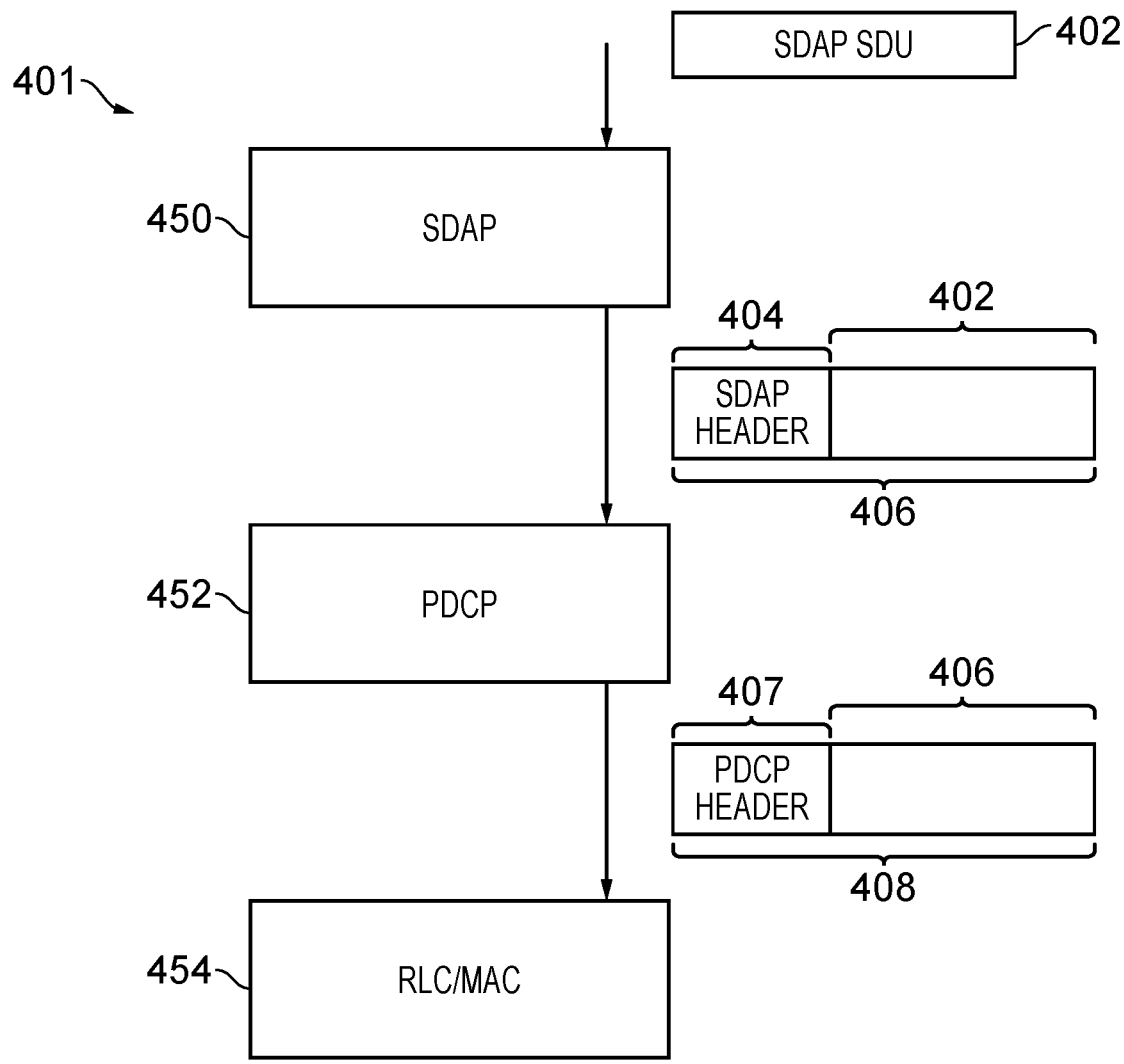
FIG. 3 schematically illustrates a portion of a protocol stack within a communications device which may be adapted to implement the techniques disclosed herein.

FIG. 3 illustrates a portion 401 of a protocol stack within a communications device which may be adapted to implement the techniques disclosed herein.

The communications device may be a wireless terminal device such as the terminal device 104 of FIG. 1 or the terminal device 400 of FIG. 2, or may be an infrastructure equipment such as the base station 101 of FIG. 1 or the controlling node 321 of FIG. 2.

The protocol stack portion 401 comprises a Service Data Adaptation Protocol (SDAP) layer, a packet data convergence protocol (PDCP) layer and a combined radio link control (RLC)/media access control (MAC) layer. Logically below the RLC/MAC layer may be a physical layer (PHY), responsible for forming the data into signals for transmission on a wireless access interface.

Each layer may comprise one or more protocol entities, each protocol entity operating in accordance with a protocol specification.

In FIG. 3, the SDAP layer comprises a Service Data Adaptation Protocol (SDAP) entity 450 and the PDCP layer comprises a packet data convergence protocol (PDCP) entity 452. The SDAP layer comprising the SDAP entity 450 may be configured for use only when the communications device is connected to a 5G core network, such as the core network 310 of FIG. 2. The SDAP layer comprising the SDAP entity 450 may be configured for use when the communications device is connected to a 5G core network, irrespective of whether the communications device communicates with a peer communications device via a 5G/NR wireless access interface or via an LTE wireless access interface.

The RLC/MAC layer comprises a combined radio link control (RLC)/media access control (MAC) entity 454 carrying out the functions of the RLC protocol and the MAC protocol. The PHY layer, which may comprise a PHY entity, is not shown for conciseness.

Together, the SDAP entity 450, the PDCP entity 452, the combined RLC/MAC protocol entity 454 and the PHY entity may form an access stratum (AS) portion of a user plane; that is, the series of protocol entities which process user plane data immediately prior to, or immediately after, transmission via a wireless access interface.

These entities are referred to as "access stratum" entities because they may operate in a manner specific to the wireless access interface. For example, they may operate in a specific manner when the wireless access interface is a Uu interface provided by a New Radio (NR) wireless access interface.

Above the SDAP entity 450 may be one or more non-access stratum (NAS) protocol entities, which operate substantially independently of the specific wireless access interface being used for the transmission of the data.

Data for transmission conventionally passes from 'higher' layers to 'lower' layers via service access points, while received data passes from lower layers to upper layers. A portion of data received by at a service access point (SAP) of a protocol entity from a higher layer may be referred to as a service data unit (SDU) of that protocol, while a portion of data generated by a protocol entity and transferred to a SAP of a protocol entity in a lower layer may be referred to as a protocol data unit (PDU).

For example, the SDAP entity 450 may receive at an SDAP SAP a portion of data 402 from a higher layer protocol entity, such as a NAS entity, or from an application layer. The portion of data 402 may thus be referred to as a first SDAP SDU 402. The portion of data 402 may comprise an internet protocol (IP) packet.

After processing by the SDAP entity 450, the data portion 402 forming the first SDAP SDU 402 may be formed into a first SDAP PDU 406, which may comprise the first SDAP SDU 402 and (optionally) an SDAP header 404. The first SDAP PDU 406 is passed to the PDCP entity 452 as a PDCP SDU.

After processing by the PDCP entity 452, the first SDAP PDU/PDCP SDU 406 is delivered to the RLC/MAC protocol entity 454 in the form of a first PDCP PDU 408, comprising the first PDCP SDU 406 and a PDCP header 407.

Processing by a protocol entity of an SDU may comprise one or more of a segmentation step, an encryption step, a concatenation or bundling step (i.e. where the PDU comprises some or all of more than one SDU). A protocol entity may buffer and/or re-order data.

A corresponding protocol stack for processing received data may be configured within a peer communications device. As such, the peer communications device may comprise a peer SDAP entity, a peer PDCP entity, and a peer RLC/MAC entity.

Where the communications device is a wireless terminal device, the peer communications device may be an infrastructure equipment; where the communications device is an infrastructure equipment, the peer communications device may be a wireless terminal device. A protocol entity may communicate with a respective peer entity (that is to say, the protocol entity operating according to the same protocol in the peer communications device). For example, the PDCP entity 452 may communicate with the peer PDCP entity by means of indications within headers or by the generation and transmission of control protocol data units.

In the example described above, it is assumed that the first SDAP SDU 402 is not segmented by the SDAP entity 450 or the PDCP entity 452. However, this need not be the case.

The transfer of a PDU from one protocol entity to an adjacent entity within the stack may be triggered by the sending protocol entity or the receiving protocol entity. For example, the RLC/MAC protocol entity 454 may poll the PDCP entity 452 for a PDCP PDU in response to receiving a grant of communication resources on the wireless access interface for uplink data transmission.

Although FIG. 3 shows the processing of data for transmission, it will be readily apparent that received data may be processed in a substantially symmetric manner i.e. by the sequential processing of received data by (in order) the RLC/MAC protocol entity 454, the PDCP entity 452 and the SDAP entity 450.

As such, the peer communications device may comprise functionality corresponding to the protocol stack 401, for the purpose of processing data received via the wireless access interface.

Data for transmission may be grouped according to its associated quality of service (QoS) requirements. Data having substantially similar, or identical, QoS requirements may form a QoS flow. For example, data received by the SDAP entity 450 may comprise data units associated with one or more QoS flows. Data units may be assigned to a QoS flow by comparing one or more characteristics of each data unit (for example, type of service (TOS) bits or a traffic class indication within an internet protocol (IP) header) with a traffic flow template (TFT) associated with each QoS flow.

Each QoS flow may be associated with a dedicated radio bearer (DRB). One or more QoS flows may be related to a single service or protocol data unit (PDU) session when connected to a 5G core network.

The SDAP entity 450 may maintain a mapping, or association, between each QoS flow on which it receives data units and one or more DRBs which have been established between the communications device and the peer communications device. A DRB may be associated with zero, one or more QoS flows.

There may be a single PDCP entity for each DRB; as such, a PDCP entity such as the PDCP entity 452 may receive data only for the DRB with which it is associated.

A description of the functionality of an SDAP entity operating in accordance with conventional techniques may be found in 3GPP TS 37.324 [2]. A description of the functionality of an PDCP entity operating in accordance with conventional techniques in a 5G/NR wireless communications network may be found in 3GPP TS 38.323 [3].

According to conventional techniques, data units received by an SDAP entity, which are associated with the same QoS flow, are processed within the access stratum in sequence. That is, a data unit received by the SDAP entity will be transmitted only once all previously received data units have been transmitted on the wireless access interface, and will be transmitted before any subsequently received data units are transmitted on the wireless access interface.

Prioritization of later-arriving data units may be realised by assigning data units of different priorities to different QoS flows and hence to different DRBs. This conventional technique requires that the QoS flows and DRBs are established in advance of the receipt of the higher priority data unit whether by means of RRC signalling or by the use of reflective QoS procedures, whereby a DRB may be assigned for data to be transmitted, based on QoS parameters contained within an SDAP header of a received packet. This introduces additional complexity which may not be justified, particularly if the amount of higher priority data units is very small (or even zero).

In some applications, it is desirable or more efficient to use a single DRB for all the data generated by a single application, or of a single type, or relating to a single stream of data. However, this may result in different data within a DRB having different characteristics.

For example, within an encoded video stream (which may be encoded in accordance with the H.264 or H.265 specifications for video encoding and decoding), certain video frames may be encoded in a manner which allows a decoder to decode the entire frame without reference to other (e.g. earlier, or later) video frames within the stream. Such a frame may be referred to as an "intra-frame" or "I-frame". The decoding of other frames (which may be referred to as 'P-frames') may, in contrast, require the availability of an earlier decoded I-frame; without the I-frame information, it may be impossible to reconstruct a P-frame. The quality of decoded video is therefore degraded more from the loss of I-frame data than from the loss of P-frame data.

As another example, when a voice signal is encoded using the adaptive multirate (AMR) encoding technique, the resulting bits may be categorized as 'Class A', 'Class B' and 'Class C'. The degradation of the audio based on a decoded bitstream is greater if Class A data is lost or corrupted, compared with the degradation arising from the loss of or errors within Class B or Class C data.

In V2X (vehicle to 'something') communication, there may be different types of co-operative awareness message (CAM). Some types, for example pre-crash sensing warning messages, may be considered of higher priority based on the relative impact if they are not delivered, relative to, for example, a lane change assistance message.

From these examples, it can be appreciated that variations in priority and/or importance can arise between different data units which are otherwise related (e.g. by application, content, or message type).

Other conventional techniques provide for a preferential discarding of data units in an LTE access stratum by means of the use of different discard timer durations, as discussed in R2-1806186 [4].

Specifically, a discard timer for a data unit containing higher priority data (such as I-frame video information) has a longer duration than a discard timer associated with a data unit not containing I-frame video information However, this technique merely ensures that, where data is discarded within the access stratum, it is less likely that I-frame information will be discarded. However, discarding data, even lower priority data, may result in further undesirable consequences. For example, compression techniques (such as robust header compression) which rely on redundancy between sequential data units may require additional transmissions and/or latency to recover from the effect of any data loss or discard in order to be able to reconstruct the headers of the data units which were not discarded, regardless of the priority of the underlying data which was discarded.

In some deployment scenarios, a device may transmit a large volume of data, for example, representing a condition of an associated piece of factory equipment. A large amount (possibly all) of the data may be associated with periodic condition reporting and may have a moderate priority requirement. However, some data may be associated with safety-critical and/or event-based condition reporting and may have a high priority requirement. In addition, some such high priority data may be associated with a very low latency requirement. Even though other data may not have such a high priority, it may nevertheless be associated with a high reliability requirement.

Such a device may be deployed in an environment containing many devices (e.g. having a density of around one per square metre of floor space), each generating data. As a result, congestion may arise, resulting in higher latencies due to queuing of data.

There has thus been identified a need to provide improved means for prioritizing data units. In particular, there has been identified a need to provide improved means for prioritizing data units that does not degrade or reduce the reliability of delivery for other data.

The disadvantages of the above techniques may be overcome by embodiments of the present technique, according to which a communications device transmits data by receiving service data units at a Service Data Adaptation Protocol, SDAP, service access point, SAP, according to one or more quality of service flows, each of the quality of service flows defining a quality of service for the data received in the service data units. The communications device maps the service data units received according to the one or more quality of service flows on to one or more radio bearers, each of the one or more radio bearers being defined by a packet data convergence protocol, PDCP, entity within a PDCP layer and forms the service data units into protocol data units for transmission via the radio bearer to which the corresponding quality of service flow has been mapped. The communications device transmits the protocol data units via the corresponding radio bearer according to the mapping, and the communications device is configured to change an order of transmission via one of the radio bearers of protocol data units formed from the first and second service data units in accordance with a determined relative priority of one or more of the service data units with respect to one or more other service data units.

Figure 4:
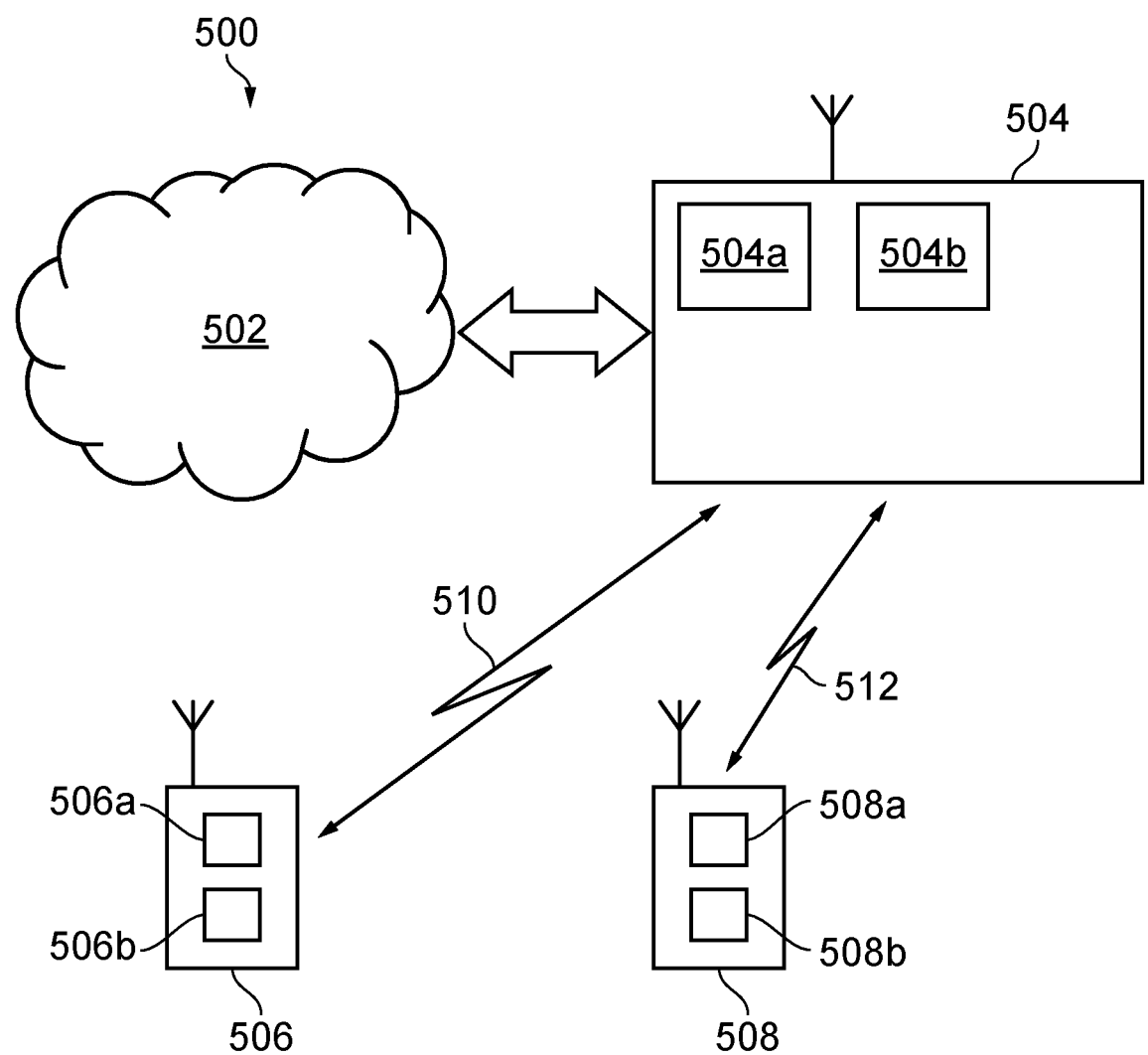
FIG. 4 schematically shows a telecommunications system 500 according to an embodiment of the present disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 3 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 3 may be broadly conventional apart from where modified to provide functionality in accordance with embodiments of the present disclosure as discussed herein.

The terminal devices 506, 508 comprise transceiver circuitry 506a, 508a (which may also be referred to as a transceiver/transceiver unit) for transmission and reception of wireless signals and processor circuitry 506b, 508b (which may also be referred to as a processor/processor unit) configured to control the devices 506, 508. The processor circuitry 506b, 508b may comprise various sub-units/sub-circuits for providing functionality as explained further herein. These sub-units may be implemented as discrete hardware elements or as appropriately configured functions of the processor circuitry. Thus the processor circuitry 506b, 508b may comprise circuitry which is suitably configured/programmed to provide the desired functionality using conventional programming/configuration techniques for equipment in wireless telecommunications systems. The transceiver circuitry 506a, 508a and the processor circuitry 506b, 508b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal devices 506, 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with the terminal devices 506, 508 according to an embodiment of the disclosure over respective communication links 510, 512. The base station 504 is configured to communicate with the terminal device 506 over the associated radio communication link 510 and with the terminal device 508 over the associated radio communication link 512 generally following the established principles of LTE-based of 5G/NR communications, apart from using modified procedures in accordance with certain embodiments of the present disclosure as described herein.

Figure 5:
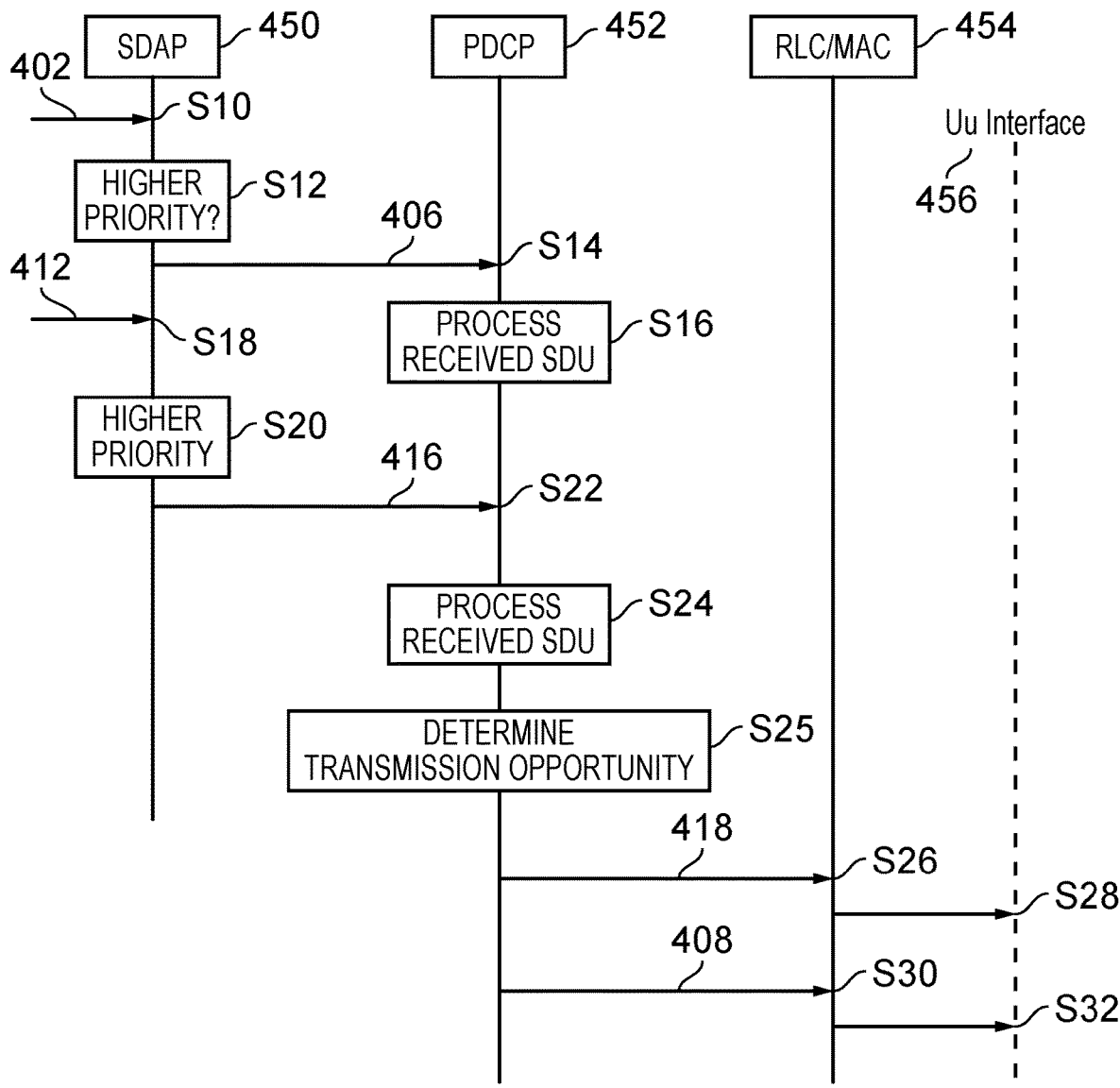
FIG. 5 illustrates a message sequence chart in accordance with example embodiments of the present technique.

FIG. 5 shows a message sequence chart in accordance with example embodiments of the present technique.

FIG. 5 shows a communications device 480, in which one or more processors (not shown) perform the functions of the SDAP entity 450, the PDCP entity 452 and the RLC/MAC protocol entity 454.

A transmitter (not shown) transmits the data via a wireless access interface 456, which may be, for example, the Uu wireless access interface configured in accordance with specifications for a 5G/New Radio (NR) wireless communications network.

At step S10, the SDAP entity 450 receives the first SDAP SDU 402, for transmission on the wireless access interface 456.

At step S12, the SDAP entity 450 identifies a QoS flow associated with the first SDAP SDU 402 and, based on the identified QoS flow, associates the first SDAP SDU 402 with a DRB. The SDAP entity 450 determines whether the first SDAP SDU 402 meets one or more criteria associated with a higher priority SDAP SDU, that is, an SDAP SDU having a higher priority, relative to one or more other SDAP SDUs. For example, the first SDAP SDU 402 could be determined to be a higher priority SDAP SDU if it comprises a critical message, such as a fire signal, an emergency shutdown signal, or contains an indication of a command which needs to be prioritised.

The determination of whether the first SDAP SDU 402 meets one or more criteria associated with a higher priority SDAP SDU may be based on an indication from an upper layer, for example, from the application layer. For example, an application which provides encoded video data to the SDAP protocol entity 452 may indicate to SDAP protocol entity 452 that the data unit is associated with the higher priority, if the data unit comprises I-frame video data.

An application which provides encoded voice data to the SDAP protocol entity 452 may indicate to SDAP protocol entity 452 that the data unit is associated with the higher priority, if the data unit comprises Class A bits.

An application which provides V2X CAM messages to the SDAP protocol entity 452 may indicate to SDAP protocol entity 452 that the data unit is associated with the higher priority, if the data unit comprises a pre-crash sensing warning message.

An application performing monitoring of a factory equipment may indicate to SDAP protocol entity 452 that the data unit is associated with the higher priority, if the data unit comprises safety-critical condition monitoring data.

The level of data importance/priority may be pre-defined or preconfigured within the communications device, and may be in accordance with a specification and/or in accordance with an operator or service provider configuration. The determination may be carried out at an application level, and the result indicated to the SDAP protocol entity 450.

An SDU may comprise one or more data units of a higher protocol layer; for example, the SDAP SDU 402 may comprise video data associated with both an I-frame and a P-frame. Where an SDU comprises multiple data units of a higher protocol layer, and the criteria for determining whether an SDU is associated with the higher priority is based on criteria associated with data units at that higher protocol layer, then the data unit may be considered to be associated with the higher priority if at least one of the higher protocol data units meets the criteria for the higher priority.

In this example, the SDAP entity 450 determines that the first SDAP SDU 402 does not meet the criteria associated with a higher priority SDAP SDU and forwards the first SDAP SDU 402 as the first SDAP PDU 406 to the PDCP entity 452 at step S14.

In some embodiments, an SDAP header 404 is added to the first SDAP SDU 402 to form the first SDAP PDU 406; in some embodiments, the SDAP header 404 is only added to a SDAP SDU (such as the first SDAP SDU 402) if the first SDAP SDU 402 meets one of the one or more criteria associated with the higher priority. In some embodiments, an indication that the first SDAP SDU 402 meets one or more criteria associated with the higher priority is included in the SDAP header 404.

At step S16, the PDCP entity 452 processes the received first PDCP SDU 406. In the example of FIG. 5, the PDCP entity 452 is associated with only a single DRB and there is therefore no need for the PDCP entity 452 to determine the DRB associated with the first PDCP SDU 406 (i.e. on which the data is to be transmitted).

In some embodiments of the present technique, the PDCP entity 452 may determine whether or not the first PDCP SDU 406 is associated with the higher priority. For example, this may be by evaluating an indication associated with the first PDCP SDU 406 received from the SDAP entity 450, by determining whether the SDAP entity 450 has added the SDAP header 404 to the first SDAP SDU 402 and if so, optionally, by determining whether the SDAP header 404 comprises an indication that the first SDAP SDU 402 meets one or more criteria associated with the higher priority.

The PDCP entity 452 may form the first PDCP PDU 408 from the first PDCP SDU 406 and the PDCP header 407 comprising a PDCP sequence number. For example, if sequence numbers 1 to 9 (inclusive) have previously been assigned to PDCP PDUs for the same DRB, the first PDCP PDU 408 may be assigned sequence number 10.

In some embodiments, header compression (such as in accordance with the internet engineering task force (IETF) robust header compression (RoHC) standard) may be applied to the first PDCP PDU 408. The header compression may be in accordance with the assigned PDCP sequence number.

The PDCP entity 452 may store the first PDCP PDU 408 in a PDCP buffer. The PDCP buffer may be used to store data for which no uplink transmission opportunity has arisen. The PDCP buffer may be specific to the DRB on which the first PDCP PDU 408 is to be transmitted. The PDCP buffer may be a first-in, first-out (FIFO) buffer.

The PDCP entity 452 may start a first PDCP discard timer, associated with the first PDCP SDU 406. The first PDCP discard timer may define a future time at which, if the first PDCP SDU 406 has not yet been transmitted or otherwise passed to the RLC/MAC protocol entity 454 and/or is still in the PDCP buffer, the PDCP entity 452 will discard the first PDCP SDU 406. The future time may be defined by a timer duration.

At step S18, a second SDAP SDU 412 is received by the SDAP entity 450.

At step S20, the SDAP entity 450 determines (in this example), based on its QoS flow, that the second SDAP SDU 412 is associated with the same DRB as the first SDAP SDU 402. The SDAP entity 450 determines whether the second SDAP SDU 412 meets the criteria associated with the higher priority. The determination may be made in substantially the same manner as described above in respect of step S12.

In this example, the SDAP entity 450 determines that the second SDAP SDU 412 meets one or more of the criteria associated with the higher priority.

In response to this determination, the SDAP entity 450 may, in some embodiments, generate an SDAP header comprising an indication that the second SDAP SDU 412 meets one or more of the criteria associated with the higher priority.

In response to the determination, the SDAP entity 450 may additionally or alternatively indicate to the PDCP entity 452 that the second SDAP SDU 412 is a higher priority SDU.

In step S22, a second SDAP PDU 416, comprising the second SDAP SDU 412 is passed from the SDAP entity 450 to the PDCP entity 452 as a second PDCP SDU 416.

At step S24, the PDCP entity 452 processes the received second PDCP SDU 416. Similar to the processing of the first PDCP SDU 406 at step S16, this processing may comprise one or more of:

determining a DRB associated with the second PDCP SDU 416 (if it is not implicit), determining whether or not the second PDCP SDU 416 is associated with the higher priority, assigning a sequence number for a second PDCP PDU 418 forming the second PDCP PDU 418 from the second PDCP SDU 416, applying header compression to the second PDCP PDU 418 storing the second PDCP PDU 418 in a PDCP buffer, and starting a second PDCP discard timer associated with the second PDCP PDU 418.

In the example shown in FIG. 5, the PDCP entity 452 determines that the second PDCP SDU 416 is associated with the higher priority. In response to this determination, the processing step S24 may differ from the processing step S16 carried out in respect of the first PDCP SDU 406 in one or more ways, as will now be described.

In some embodiments of the present technique, a PDCP SDU (or a PDCP PDU containing a PDCP SDU) which is determined to have the higher priority (such as the second PDCP SDU 416) has associated with it a discard timer having a longer duration than a discard timer associated with a PDCP SDU not having the higher priority. As such, a PDCP SDU having the higher priority will only be discarded (and therefore not transmitted) if no opportunity for its transmission has arisen within a time period, starting at the time of receipt of the PDCP SDU by the PDCP entity 452, the time period being longer in duration than a corresponding time period associated with a PDCP SDU not having the higher priority. In the example of FIG. 5, therefore, the PDCP entity 452 may, at step S24, assign to the second PDCP PDU 418 a discard timer having a shorter time to expiry than the time to expiry of the discard timer assigned to the first PDCP PDU 416.

In some embodiments of the present technique, a PDCP PDU formed from a PDCP SDU which is determined to not have the higher priority (such as the first PDCP SDU 406) is assigned a PDCP sequence number which is the next in sequence for the DRB and which has not been associated with any PDCP PDU (including those currently stored in the PDCP buffer).

In contrast, in some embodiments, a PDCP PDU formed from a PDCP SDU which is determined to have the higher priority (such as the second PDCP SDU 416) is assigned a PDCP sequence number which is the next in sequence for the DRB and which has not previously been associated with a PDCP PDU which has already been passed to the RLC/MAC protocol entity 454 for transmission. For example, if PDCP PDUs associated with sequence numbers 1 to 9 inclusive have been transferred to the RLC/MAC protocol entity 454 for transmission, a second PDCP PDU 416 formed from the second PDCP SDU 416 may be assigned the sequence number 10.

As such, the second PDCP SDU 416 may be assigned a sequence number (10) which has already been assigned to a PDCP PDU (such as the first PDCP PDU 408) associated with the same DRB and which is currently stored in the PDCP buffer. Therefore, in some embodiments, as part of the processing step S24 in respect of a PDCP SDU having the higher priority, the PDCP entity 452 may assign different sequence numbers (i.e. different to those previously assigned) to those PDCP PDUs which belong to the same DRB as the higher priority SDU and are currently stored in the PDCP buffer. For example, the PDCP entity 452 may assign the sequence number 11 to the first PDCP PDU 406.

In some embodiments, in response to determining that the second SDAP PDU 416 is the higher priority SDAP PDU at step S24, the PDCP entity 452 may form the second PDCP PDU 418 and buffer the second PDCP PDU 418 such that it is at the head of the buffer (i.e. will be the next PDCP PDU to be transmitted of all PDCP PDUs in the buffer associated with the same DRB).

At step S25 the PDCP entity 452 determines that a transmission opportunity exists for a PDCP PDU. This may be, for example, in response to receiving an indication from the RLC/MAC protocol entity 454 that a transmission opportunity has arisen for a PDCP PDU belonging to a particular DRB.

Where the communications device 480 is a wireless terminal device such as the terminal device 104 of FIG. 1 or the terminal device 400 of FIG. 2, uplink transmission opportunities may be controlled by a serving infrastructure equipment such as the base station 101 of FIG. 1 or the controlling node 321 of FIG. 2. The RLC/MAC protocol entity 454 may determine that a transmission opportunity exists for a PDCP PDU associated with a DRB based on receiving an uplink grant from the serving infrastructure equipment.

Where the communications device 480 is an infrastructure equipment such as the base station 101 of FIG. 1 or the controlling node 321 of FIG. 2, downlink transmission opportunities may be determined in accordance with a scheduling algorithm, based on, for example, queued downlink data to be transmitted, its quality of service (QoS) requirements, and wireless channel conditions between the infrastructure equipment and the respective destination communications device.

In response to determining that a transmission opportunity exists for a PDCP PDU of the DRB associated with the first PDCP PDU 408 and the second PDCP PDU 418, the PDCP entity 452 retrieves the second PDCP PDU 418 from the PDCP buffer and transfers it to the RLC/MAC protocol entity for transmission at step S26.

Subsequently, at step S28, the second PDCP PDU 418 is transmitted on the wireless access interface 456 by the RLC/MAC protocol entity 454. The second PDCP PDU 418 may be processed by the RLC/MAC protocol entity 454 and the PHY entity (not shown) prior to transmission on the wireless access interface 456. The RLC/MAC protocol entity 454 and PHY entity may process the second PDCP PDU 418 in accordance with well-known conventional techniques, such as those specified for the 5G/NR wireless access interface.

At steps S30 and S32 the first PDCP PDU 408 is transferred to the RLC/MAC protocol entity 454 and transmitted on the wireless access interface 456, in response to a further identification of an opportunity for transmission via the DRB (not shown).

Figure 6:
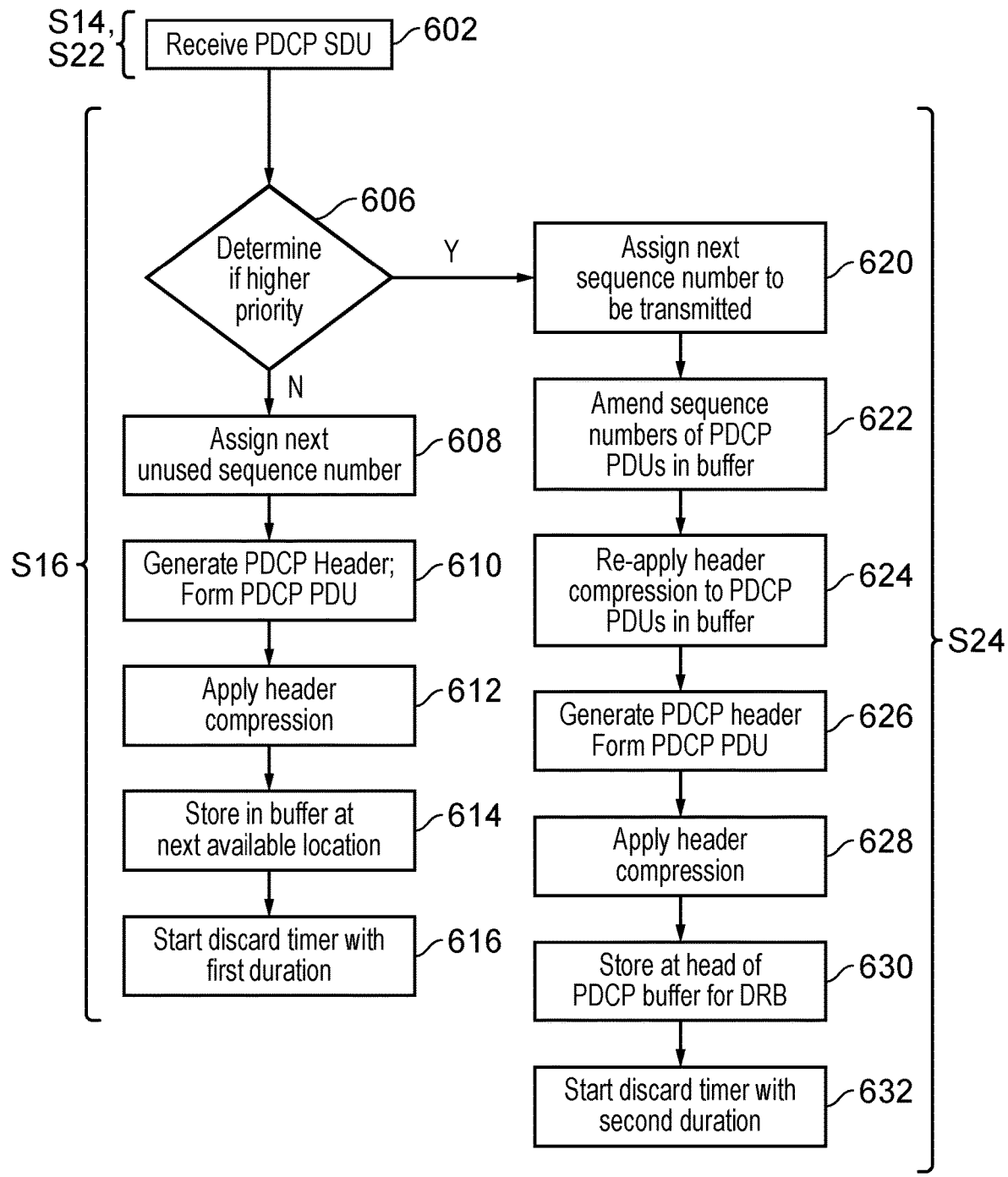
FIG. 6 is a flow chart illustrating a process in accordance with example embodiments of the present technique.

FIG. 6 is a flow chart illustrating a process corresponding to step S16 and step S24 together with steps S14 and S22 shown in FIG. 5 and described above.

The process starts at step 602 in which a PDCP SDU such as the first PDCP SDU 406 is received from the SDAP entity 450, by the PDCP entity 452. This corresponds to steps S14 and S22 shown in FIG. 5. The first PDCP SDU 406 may be accompanied by an indication of the DRB associated with the first PDCP SDU 406, or the DRB indication may be implicit in the selection of the PDCP entity 452 to receive the first PDCP SDU 406. The first PDCP SDU 406 may be accompanied by an indication as to whether the first PDCP SDU 406 is associated with the higher priority or not.

Following step 602, the PDCP entity 452 may determine (if it is not implicit) the DRB associated with the received first PDCP SDU 406.

At step 606 the PDCP entity 452 determines whether the received first PDCP SDU 406 is associated with the higher priority. The PDCP entity 452 may use one or more of the criteria described above in the description of step S12 of FIG. 5, or may be by means of an indication received from the SDAP entity 450, or by inspecting the SDAP header 404 forming part of the first PDCP SDU 406. If it is determined at step 606 that the received first PDCP SDU 406 is not associated with the higher priority, then flow passes to step 608.

At step 608 the received first PDCP SDU 406 is assigned the next unused sequence number corresponding to the DRB. That is, the sequence number which is next in sequence and which has not been assigned to any earlier PDCP SDU of the same DRB.

The process then continues to step 610 in which the PDCP header 407 is generated for the first PDCP SDU 406 in accordance with the assigned sequence number. The first PDCP SDU 406 may be combined with the PDCP header 407 to form the first PDCP PDU 408.

In step 612 header compression (such as robust header compression) may be applied to the formed first PDCP PDU 408.

In step 614 the first PDCP PDU 408 is stored at the next available location in the buffer corresponding to the DRB. In other words, the first PDCP PDU 408 is added to the end of a queue of PDCP PDUs waiting for transmission via the DRB.

At step 616 a PDCP discard timer is started in respect of the formed first PDCP PDU 408. The duration of the timer may be set to a first duration in accordance with the determination at step 606 that the first PDCP PDU 408 is not associated with the higher priority.

Returning to step 606, if it is determined that the received PDCP SDU is associated with the higher priority (for example, because the received PDCP SDU is the second PDCP SDU 416) then control passes to step 620 in which the second PDCP SDU 416 is assigned a sequence number which is the sequence number of the next PDCP PDU to be transmitted via the DRB. That is, the second PDCP SDU 416 is assigned the lowest sequence number which has not been associated with any PDCP PDU which has already been passed to the RLC/MAC protocol entity for transmission.

At step 622 the PDCP entity 452 may amend the sequence numbers associated with PDCP PDUs which have previously been generated and stored in the buffer for the DRB. This reflects the possibility that the sequence number which has been assigned to the most recently received second PDCP SDU 416 has previously been assigned to a different PDCP PDU (such as the first PDCP SDU 406) which is currently stored in the PDCP buffer for the DRB.

At step 624 the PDCP entity 452 may re-form the PDCP headers associated with PDCP PDUs which are stored in the PDCP buffer for the DRB and may subsequently apply header compression to the modified PDCP PDUs. The process continues at step 626 in which the PDCP entity 452 generates the PDCP header 407 for the second PDCP SDU 416 and thus forms the second PDCP PDU 418.

At step 628, the PDCP entity 452 applies robust header compression to the newly formed second PDCP PDU 418, and at step 630, the newly formed second PDCP PDU 418 is stored at the front of the PDCP buffer for the DRB. That is, the second PDCP PDU 418 is to be the next PDCP PDU which is passed to the RLC/MAC entity for transmission on the DRB.

At step 632 the PDCP entity 452 starts a PDCP discard timer in respect of the newly formed second PDCP PDU 418. Reflecting the determination at step 606 that the received second PDCP SDU 416 which forms the second PDCP PDU 418 is associated with the higher priority, the PDCP discard timer is started with a second duration, which is longer than the first duration which would have been assigned to the PDCP discard timer to a PDCP PDU not having the higher priority, as described above in step 616.

In FIG. 6 the sequence of steps 606, 608, 610, 612, 614, and 616 broadly correspond to the processing carried out at step S16 of FIG. 5.

Similarly, the sequence of steps 606, 620, 622, 624, 626, 628, 630 and 632 broadly correspond to the processing carried out at step S24 of FIG. 5.

In the processes illustrated in FIG. 5 and in FIG. 6, and described above, the PDCP entity 452 forms PDCP PDUs in response to the receipt of a new PDCP SDU from the SDAP entity 450. As such, the PDCP buffer contains a sequence of one or more PDCP PDUs associated with a DRB, for subsequent transfer to the RLC/MAC entity 454 for transmission on the wireless access interface 456.

In some embodiments, the PDCP entity 452 instead stores PDCP SDUs in the PDCP buffer. The PDCP entity 452 may form the PDCP PDUs, such as the second PDCP PDU 418 and the first PDCP PDU 408, in response to determining that there is a transmission opportunity for a PDCP PDU associated with the DRB.

Figure 7:
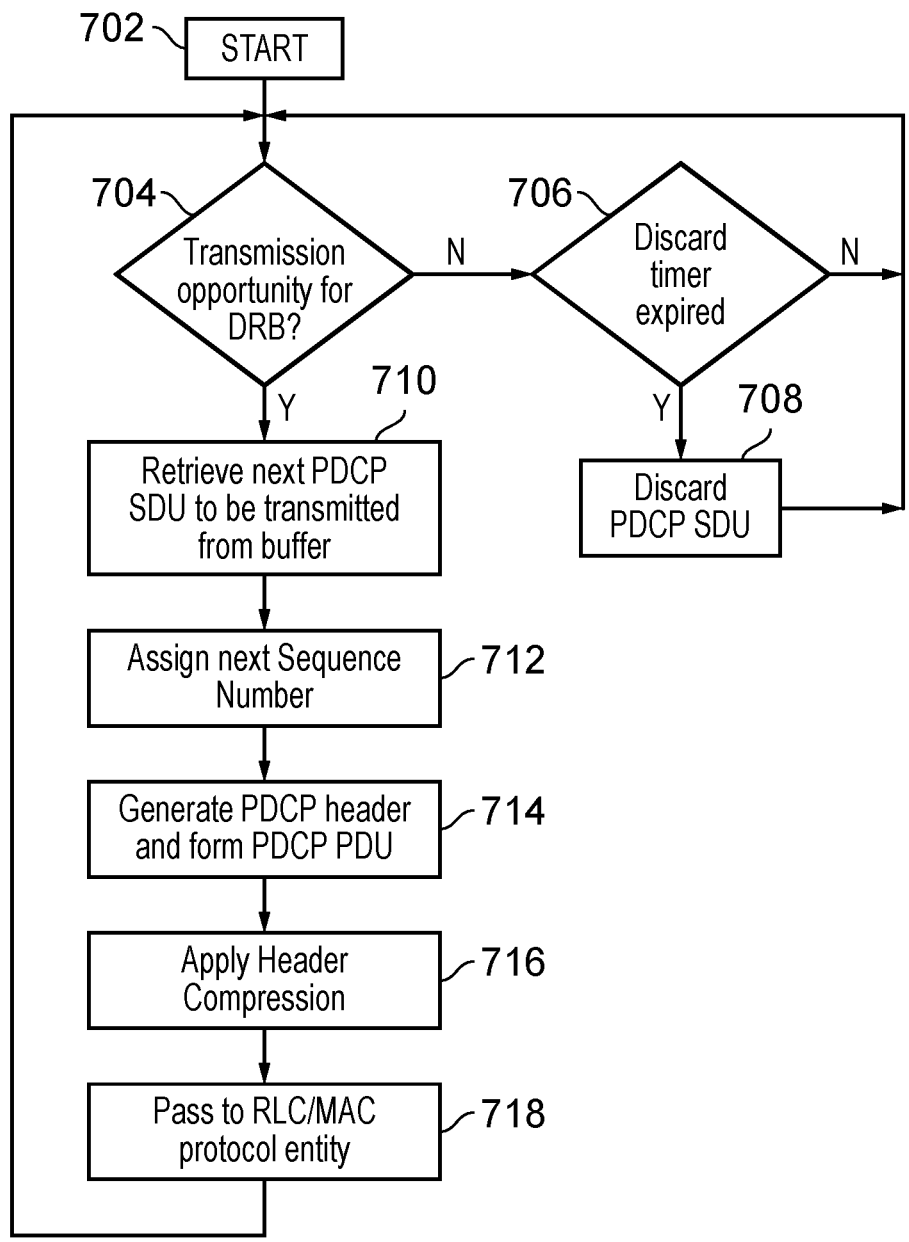
FIG. 7 illustrates a process by which a protocol entity forms protocol data units in accordance with some embodiments of the present technique.

FIG. 7 illustrates a process by which the PDCP entity 452 forms PDCP PDUs in accordance with some embodiments of the present technique in which the PDCP buffer is used to store PDCP SDUs.

The process starts at step 702 and the process continues at step 704 in which it is determined whether or not there is a transmission opportunity for a PDCP PDU of the DRB. If no transmission opportunity is determined to exist then control passes to step 706.

In step 706 the PDCP entity 452 may determine whether a discard timer has expired in respect of any PDCP SDUs which are stored in the PDCP buffer. If any discard timers are found to have expired, then control passes to step 708 in which each PDCP SDU associated with an expired timer is discarded, such that it will not be passed to the RLC/MAC entity 454 for transmission on the wireless access interface 456.

After step 708 control returns to step 704. Similarly, if at step 706 it is determined that no discard timers associated with PDCP SDUs currently in the PDCP buffer have expired, then control returns to step 704.

If at step 704 it is determined that there is a transmission opportunity for a PDCP PDU via the DRB, then control passes to step 710.

In step 710, the PDCP entity retrieves the PDCP SDU (such as the first PDU SDU 406) which is the next to be transmitted from the PDCP buffer.

At step 712, the first PDCP SDU 406 is assigned the next sequence number, that is to say the lowest sequence number which has not yet been used for any PDCP PDU which has been transmitted via the DRB.

At step 714 the PDCP entity forms the PDCP header 407 and thereby constructs the first PDCP PDU 408 comprising the first PDCP SDU 406 which has been retrieved from the buffer and the header 407 indicating the assigned sequence number. At step 716 header compression is applied to the first PDCP PDU 408, and in step 718 the first PDCP PDU 408 is passed to the RLC/MAC protocol entity 454 for transmission on the wireless access interface 456.

In accordance with the process illustrated in FIG. 7 and described above, the process illustrated in FIG. 6 may be accordingly modified so that there is no need to assign a sequence number, or to construct the PDCP header 407 or to form the first PDCP PDU 408 at the time when the first PDCP SDU 406 is received from the SDAP entity 450. As such, in some embodiments, the process of FIG. 6 may be modified in accordance with the process of FIG. 7 by the omission of steps 608, 610, 612 in respect of PDCP SDUs not determined to be associated with the higher priority, and by the omission of steps 620, 622, 624, 626 and 628 in respect of PDCP SDUs which are determined to be associated with the higher priority. Such a modified process may operate substantially concurrently with the process of FIG. 7.

Alternatively, in accordance with the process illustrated in FIG. 6 and described above, the process illustrated in FIG. 7 may be accordingly modified so that at step 710, a next PDCP PDU is retrieved from the PDCP buffer, and steps 714, 716 and 718 may be omitted. Such a modified process may operate substantially concurrently with the process of FIG. 6.

In some embodiments, one or more of the process steps of FIG. 5, FIG. 6 and FIG. 7 may be omitted, and/or one or more of the process steps may occur in a different order from that shown in a Figure and described above.

In some embodiments, a PDCP PDU (such as the second PDCP PDU 418) having the higher priority may be inserted into the buffer at the head of the sequence for the DRB, or otherwise transmitted ahead of any other buffered PDCP PDUs (such as the first PDCP PDU 408) via the DRB, but with a sequence number assigned which corresponds to the order in which the second PDCP SDU 416 (from which the second PDCP PDU 418 was formed) was received from the SDAP entity 450, relative to the other PDCP SDUs, including the first PDCP SDU 406.

In some such embodiments, step 620 may be modified to be substantially the same as step 608, and steps corresponding to steps 622 and 624 of FIG. 6 may be omitted; that is, no modification is made to PDCP PDUs already buffered, in response to the receipt by the PDCP entity 452 of a higher priority PDCP SDU.

In some embodiments of the present technique, the PDCP and SDAP protocol entities within the peer communications device function in accordance with conventional techniques. In some embodiments the peer PDCP entity may be configured to provide out of order, or out of sequence, delivery to upper layers in the peer communications device.

In some embodiments of the present technique, the peer communications device which receives the transmitted PDCP PDUs may determine that a PDCP PDU (such as the first PDCP PDU 408) is associated with the higher priority. This determination may be based on one or more of the presence of the SDAP header 404, the presence of an indication within the SDAP header 404 that the first PDCP PDU 408 is associated with the higher priority, and an indication within the PDCP header 407 that the first PDCP PDU 408 is associated with the higher priority.

Based on the determination that the PDCP PDU is associated with the higher priority, the peer communications device may forward the first SDAP SDU 402 contained within the received first PDCP PDU 408 to the upper (e.g. NAS layer or application layer) without delay, and in particular irrespective of whether the sequence number associated with the first PDCP PDU 408 indicates that it is the next in-sequence PDCP PDU whose contents (i.e. the first SDAP SDU 402) should be provided to the upper layers.

The peer communications device may, in response to determining that the first PDCP PDU 408 is not associated with the higher priority, determine based on the sequence number associated with the first PDCP PDU 408 whether it is the next in-sequence PDCP PDU to be passed to the upper layers (e.g. the SDAP layer); if it is, the first PDCP SDU 408 is extracted and passed to the SDAP layer and hence to the NAS layer or application layer, for example, in accordance with conventional techniques for in-order delivery. If the sequence number associated with the first PDCP PDU 408 indicates that the first PDCP SDU 406 is not the next in-sequence PDCP PDU to be passed to the upper layers, then, in contrast to the process were the first PDCP PDU 408 to be associated with the higher priority, the first PDCP PDU 408 or the first PDCP SDU 406 is stored in a receiver PDCP buffer.

In some embodiments of the present technique, two or more DRBs, including a first DRB and a second DRB, are configured for communications between the communications device and the peer communications device. The second DRB is configured such that data transmitted using the second DRB is transmitted with higher priority than data transmitted using the first DRB.

Initially, a QoS flow is mapped to the first DRB and all data units associated with the QoS flow are transmitted using the first DRB.

In response to determining that a data unit of the QoS flow is a higher priority data unit, the SDAP entity 450 initiates a QoS flow relocation such that the higher priority data unit (and, in some embodiments, one or more further data units associated with the QoS flow) is transmitted using the second DRB. The data units may be transmitted via the second DRB in the same order that they were received at the SDAP layer, or they may be re-ordered based at least in part of their relative priorities. In some embodiments, the establishment of the second DRB may be in response to the determining that a data unit of the QoS flow is a higher priority data unit. In some embodiments, the initiation of the QoS flow relocation and/or the establishment of the second DRB may be in response to a determination that a congestion level associated with the wireless access interface has exceeded a predetermined threshold.

The QoS flow relocation procedure may occur in accordance with conventional known techniques, such as those described in the 3GPP document R2-1807179 [5].

In some embodiments of the present technique, the protocol stack portion 401 may be implemented in a communications device providing condition monitoring for a factory equipment. The communications device may be integrated within the factory equipment. The first and second SDAP SDUs 402, 412 may be associated with a condition monitoring function of the communications device and may provide a condition status associated with the factory equipment.

The first SDAP SDU 402 may be associated with an interval-based condition monitoring function of the communications device. The second SDAP SDU 412 may be associated with a condition monitoring for safety function or an event-based condition monitoring function of the communications device.

In the present description, steps have been described as being carried out by particular protocol entities, such as the SDAP entity 450 and the PDCP entity 452. However, these steps may be carried out by different protocol entities, without departing from the scope of the present disclosure.

For example, in some embodiments, the steps, such as steps S12 and S20 of FIG. 5 and step 602 of FIG. 6, described herein as being carried out at the SDAP entity 450 may instead be carried out by the PDCP entity 452.

In some embodiments, the SDAP entity 450 and the PDCP entity 452 process the data units, and transfer them as PDCP PDUs in substantially the order in which they were received at the SDAP SAP. The RLC entity (forming part of the RLC/MAC entity 454) determines whether or not PDCP PDUs within a DRB are determined to have the higher priority, and generates an order for transmission of the PDCP PDUs (or RLC segments comprising the PDCP PDUs) based on the outcome of the determination. The RLC entity thus performs some of the steps described herein as being carried out by the SDAP entity 450 or the PDCP entity 452. In some embodiments, header compression is not used. In some embodiments, where the RLC entity segments a PDCP PDU, the RLC entity transmits each RLC segment of a PDCP PDU before transmitting any RLC segment of a different PDCP PDU.

Thus there has been described a method of transmitting data by a communications device. The method comprises receiving a plurality of service data units including a first service data unit and a second service data unit at a Service Data Adaptation Protocol, SDAP, service access point, SAP, according to one or more quality of service, QoS, flows, each of the QoS flows defining a quality of service for the data received from the service data units, mapping the service data units received according to the one or more QoS flows on to one or more radio bearers, each of the one or more radio bearers being defined by a packet data convergence protocol, PDCP, entity within a PDCP layer, forming the service data units into protocol data units for transmission via the radio bearer to which the corresponding QoS flow has been mapped, and transmitting the protocol data units via the corresponding radio bearer according to the mapping, wherein the communications device is configured to change an order of transmission via one of the radio bearers of protocol data units formed from service data units from the same QoS flow in accordance with a determined relative priority of one or more of the service data units with respect to one or more other service data units of the same QoS flow.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

The reference to protocol entities in the present description to characterise a behaviour of an apparatus is to provide clarity in the description of the behaviour falling within the scope of the present disclosure. In accordance with embodiments of the present technique, steps described as being carried out by one protocol entity may be carried out by a different protocol entity without departing from the scope of the present disclosure.

The present disclosure does not limit any particular implementation and protocol entities may or may not be reflected in the actual implementation of an apparatus which operates in accordance with the present description. For example, steps described as being carried out by different protocol entities may be carried out by a common processor; conversely, steps described as being carried out by the same protocol entity may be performed by different processors. One or more steps may be performed in hardware, while other steps may be carried out by a processor running software.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based and 5G/NR-based wireless telecommunications systems, but are applicable for any type of wireless telecommunications system.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a communications device, the method comprising receiving a plurality of service data units including a first service data unit and a second service data unit at a Service Data Adaptation Protocol, SDAP, service access point, SAP, according to one or more quality of service, QoS, flows, each of the QoS flows defining a quality of service for the data received from the service data units, mapping the service data units received according to the one or more QoS flows on to one or more radio bearers, each of the one or more radio bearers being defined by a packet data convergence protocol, PDCP, entity within a PDCP layer, forming the service data units into protocol data units for transmission via the radio bearer to which the corresponding QoS flow has been mapped, and transmitting the protocol data units via the corresponding radio bearer according to the mapping, wherein the communications device is configured to change an order of transmission via one of the radio bearers of protocol data units formed from the first and second service data units in accordance with a determined relative priority of one or more of the service data units with respect to one or more other service data units.

Paragraph 2. A method according to Paragraph 1, the method comprising determining that the second service data unit has a relative priority higher than the relative priority of the first service data unit.

Paragraph 3. A method according to Paragraph 2, the method comprising: in response to the determining, assigning a first PDCP, sequence number to the first service data unit, and assigning a second PDCP sequence number to the second data unit, wherein the first PDCP sequence number is higher than the second PDCP sequence number.

Paragraph 4. A method according to Paragraph 3, the method comprising: compressing a header associated with the first data unit and a header associated with the second data unit in accordance with the assigned first and second PDCP sequence numbers.

Paragraph 5. A method according to any of Paragraphs 2 to 4, the method comprising: starting a first discard timer associated with the first data unit, the first discard timer to expire after a first timer duration, and starting a second discard timer associated with the second data unit, the second discard timer to expire after a second timer duration wherein the second timer duration is longer than the first timer duration.

Paragraph 6. A method according to any of Paragraphs 2 to 4, wherein the first and second data units are associated with a first quality of service, QoS, flow mapped to a first dedicated radio bearer, DRB Paragraph 7. A method according to any of Paragraphs 2 to 6, wherein the first DRB is associated with a first DRB priority, the method comprising: in response to at least one of determining that the second service data unit has a relative priority higher than the relative priority of the first service data unit, and a congestion threshold being met, associating the first QoS flow with a second DRB, the second DRB associated with a second DRB priority higher than the first DRB priority.

Paragraph 8. A method according to Paragraph 7, wherein the associating comprises initiating a QoS flow relocation procedure.

Paragraph 9. A method according to any of Paragraphs 2 to 8, the method comprising: generating a SDAP protocol data unit, PDU, the SDAP PDU comprising the second data unit and an SDAP header, wherein the SDAP header comprises an indication that the second data unit meets one or more criteria associated with the higher relative priority Paragraph 10. A method according to any of Paragraphs 1 to 9, wherein the communications device is configured to change at a radio link control, RLC, protocol entity the order of transmission via the one of the radio bearers of the protocol data units formed from the first and second service data units.

Paragraph 11. A method according to any of Paragraphs 1 to 9, wherein the communications device is configured to change at the packet data convergence protocol, PDCP, entity defining the one of the radio bearers the order of transmission of the protocol data units formed from the first and second service data units.

Paragraph 12. A communications device for transmitting data via a wireless communications network, the communications device comprising: a transceiver configured to transmit signals and to receive signals on a wireless access interface of the wireless communications network, a processor configured to control the transceiver to transmit the signals representing the data, the processor being configured: to receive at a service data adaptation protocol, SDAP, service access point, SAP, service data units according to one or more quality of service, QoS, flows, each of the QoS flows defining a quality of service for the data received in the service data units, to map the service data units received according to the one or more QoS flows on to one or more radio bearers, to form the service data units into protocol data units for transmission via the radio bearer to which the corresponding QoS flow has been mapped, to change an order of transmission via one of the radio bearers of protocol data units formed from the first and second service data units in accordance with a determined relative priority of one or more of the service data units with respect to one or more other service data units, and to transmit the service data units via the corresponding radio bearer according to the mapping.

Paragraph 13. Circuitry for a communications device for transmitting data via a wireless communications network, the communications device comprising: transceiver circuitry configured to transmit signals and to receive signals on a wireless access interface of the wireless communications network, processor circuitry configured to control the transceiver circuitry to transmit the signals representing the data, the processor circuitry being configured: to receive at a service data adaptation protocol, SDAP, service access point, SAP, service data units according to one or more quality of service, QoS, flows, each of the QoS flows defining a quality of service for the data received in the service data units, to map the service data units received according to the one or more QoS flows on to one or more radio bearers, to form the service data units into protocol data units for transmission via the radio bearer to which the corresponding QoS flow has been mapped, to change an order of transmission via one of the radio bearers of protocol data units formed from the first and second service data units in accordance with a determined relative priority of one or more of the service data units with respect to one or more other service data units, and to transmit the service data units via the corresponding radio bearer according to the mapping.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009
[2] 3GPP TS 37.324 v.1.5.0, "Service Data Adaptation Protocol (SDAP) specification (Release 15)", April 2018
[3] 3GPP TS 38.323 v.15.1.0 "Packet Data Convergence Protocol (PDCP) specification (Release 15)", March 2018
[4] 3GPP document R2-1806186 "L2 differentiated handling of critical data", Ericsson, 3GPP TSG-RAN WG2 #101bis, Sanya, P. R. of China, 16th-20th April 2018
[5] 3GPP document R2-1807179 "Email discussion of [101bis #76][UP] SDAP end marker solutions", Huawei, 3GPP TSG RAN WG2 Meeting #102, Busan, Korea, 21-25 May 2018

What is claimed is:

1. A method of transmitting data by a communications device, the method comprising:
receiving a plurality of service data units including a first service data unit and a second service data unit at a Service Data Adaptation Protocol (SDAP) service access point (SAP) according to one or more quality of service (QOS) flows, each of the one or more QoS flows defining a QoS for data received from the service data units;
determining whether the first service data unit has a relative priority higher than a relative priority of the second service data unit;
in a case that the determining indicates that the first service data unit has the relative priority higher than that of the second data unit:
assigning a first PDCP sequence number to the first service data unit; and
assigning a second PDCP sequence number to the second data unit, the first PDCP sequence number being higher than the second PDCP sequence number;
mapping the service data units received according to the one or more QoS flows on to one or more radio bearers, each radio bearer of the one or more radio bearers defined by a packet data convergence protocol (PDCP) entity within a PDCP layer;
forming the service data units into protocol data units for transmission via the radio bearer to which the corresponding QoS flow is mapped; and
transmitting the protocol data units via the corresponding radio bearer according to the mapping and in order of PDCP sequence number.

2. The method according to claim 1, the method comprising:
compressing a header associated with the first data unit and a header associated with the second data unit in accordance with the assigned first and second PDCP sequence numbers.

3. The method according to claim 1, further comprising:
starting a first discard timer associated with the first data unit, the first discard timer to expire after a first timer duration; and
starting a second discard timer associated with the second data unit, the second discard timer to expire after a second timer duration, wherein
the second timer duration is longer than the first timer duration.

4. The method according to claim 1, wherein the first and second data units are associated with a first QoS flow mapped to a first dedicated radio bearer (DRB).

5. The method according to claim 1, wherein
the first DRB is associated with a first DRB priority, and
the method further comprising:
in response to at least one of determining that the second service data unit has a relative priority higher than the relative priority of the first service data unit, and a congestion threshold being met, associating the first QoS flow with a second DRB, the second DRB associated with a second DRB priority higher than the first DRB priority.

6. The method according to claim 5, wherein the associating comprises initiating a QoS flow relocation procedure.

7. The method according to claim 1, further comprising:
generating a SDAP protocol data unit, PDU, the SDAP PDU comprising the second data unit and an SDAP header, wherein
the SDAP header comprises an indication that the second data unit meets one or more criteria associated with the higher relative priority.

8. The method according to claim 1, wherein the communications device is configured to change at a radio link control (RLC) protocol entity the order of transmission via the one of the radio bearers of the protocol data units formed from the first and second service data units.

9. The method according to claim 1, wherein the communications device is configured to change at the packet data convergence protocol (PDCP) entity defining the one of the radio bearers the order of transmission of the protocol data units formed from the first and second service data units.

10. The method according to claim 1, wherein the first PDCP sequence number is a next sequence number to be transmitted.

11. The method according to claim 1, further comprising, in a case that the determining indicates that the first service data unit does not have the relative priority higher than that of the second data unit:
assigning the first PDCP sequence number to the second service data unit; and
assigning the second PDCP sequence number to the first data unit.

12. A communications device for transmitting data via a wireless communications network, the communications device comprising:
a transceiver configured to transmit signals and to receive signals on a wireless access interface of the wireless communications network; and
processing circuitry configured to control the transceiver to transmit the signals representing the data, wherein
the processing circuitry is further configured with the transceiver to:
receive at a service data adaptation protocol (SDAP) service access point (SAP) service data units according to one or more quality of service (QoS) flows, each of the one or more QoS flows defining a QoS for data received in the service data units;
determine whether the first service data unit has a relative priority higher than a relative priority of the second service data unit;
in a case that the determining indicates that the first service data unit has the relative priority higher than that of the second data unit:
assign a first PDCP sequence number to the first service data unit; and
assign a second PDCP sequence number to the second data unit, the first PDCP sequence number being higher than the second PDCP sequence number;
map the service data units received according to the one or more QoS flows on to one or more radio bearers;
form the service data units into protocol data units for transmission via the radio bearer to which the corresponding QoS flow is mapped; and
transmit the service data units via the corresponding radio bearer according to the mapping and in order of PDCP sequence numbers.

13. The communications device according to claim 12, wherein the first PDCP sequence number is a next sequence number to be transmitted.

14. The communications device according to claim 12, wherein the processing circuitry is further configured to, in a case that the determining indicates that the first service data unit does not have the relative priority higher than that of the second data unit:
assign the first PDCP sequence number to the second service data unit; and
assign the second PDCP sequence number to the first data unit.

15. Circuitry for a communications device for transmitting data via a wireless communications network, the circuitry comprising:
transceiver circuitry configured to transmit signals and to receive signals on a wireless access interface of the wireless communications network; and
processing circuitry configured to control the transceiver circuitry to transmit the signals representing the data, wherein
the processing circuitry is further configured with the transceiver circuitry to:
receive at a service data adaptation protocol (SDAP) service access point (SAP) service data units according to one or more quality of service (QoS) flows, each of the one or more QoS flows defining a QoS for data received in the service data units;
determine whether the first service data unit has a relative priority higher than a relative priority of the second service data unit;
in a case that the determining indicates that the first service data unit has the relative priority higher than that of the second data unit:
assign a first PDCP sequence number to the first service data unit; and
assign a second PDCP sequence number to the second data unit, the first PDCP sequence number being higher than the second PDCP sequence number;
map the service data units received according to the one or more QoS flows on to one or more radio bearers;

form the service data units into protocol data units for transmission via the radio bearer to which the corresponding QoS flow is mapped; and transmit the service data units via the corresponding radio bearer according to the mapping and in order of PDCP sequence numbers.

16. The circuitry according to claim 15, wherein the first PDCP sequence number is a next sequence number to be transmitted.

17. The circuitry according to claim 15, wherein the processing circuitry is further configured to, in a case that the determining indicates that the first service data unit does not have the relative priority higher than that of the second data unit:

assign the first PDCP sequence number to the second service data unit; and assign the second PDCP sequence number to the first data unit.

* * * * *